Patented Jan. 28, 1936

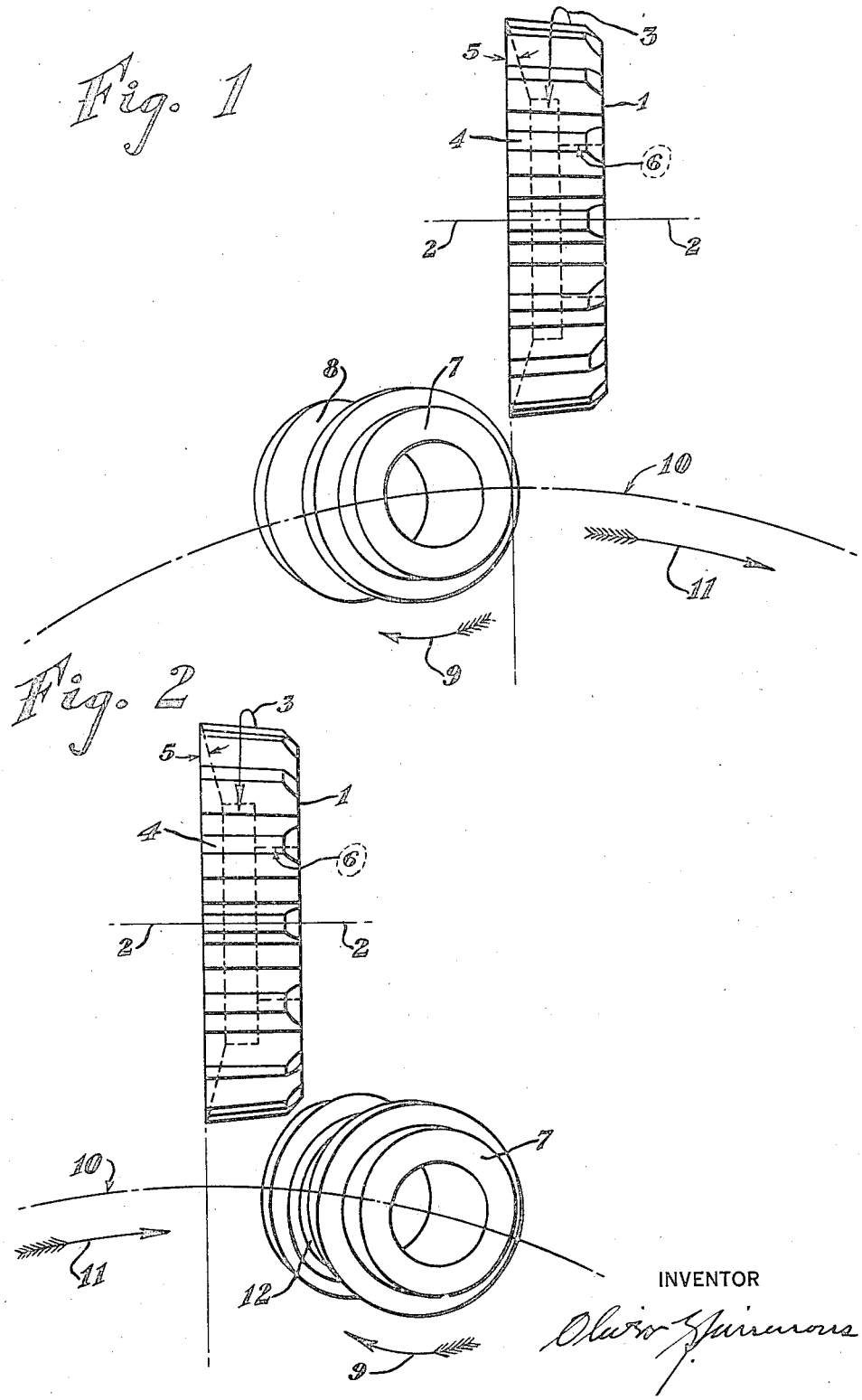

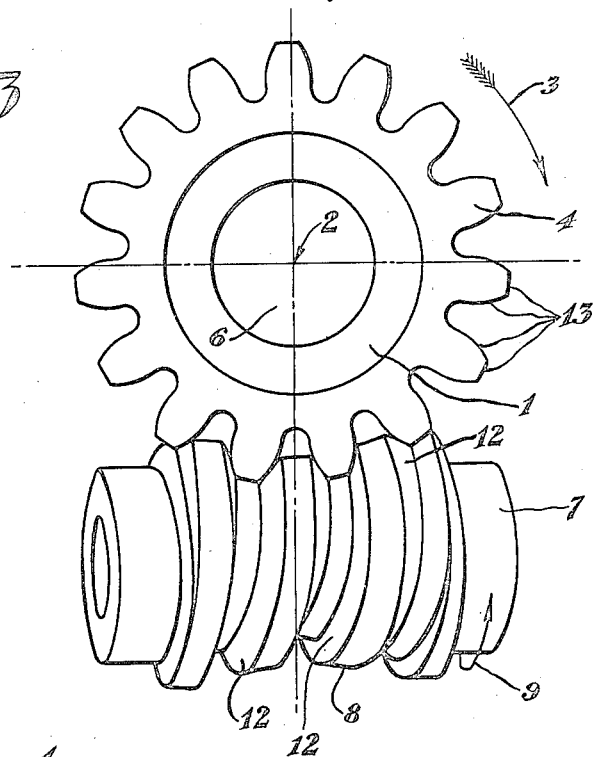
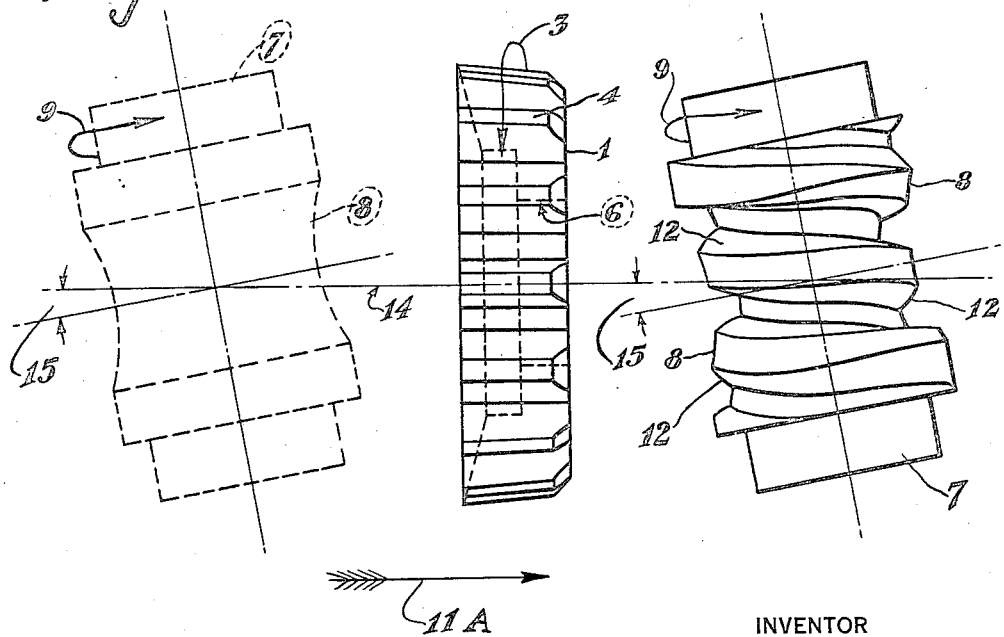

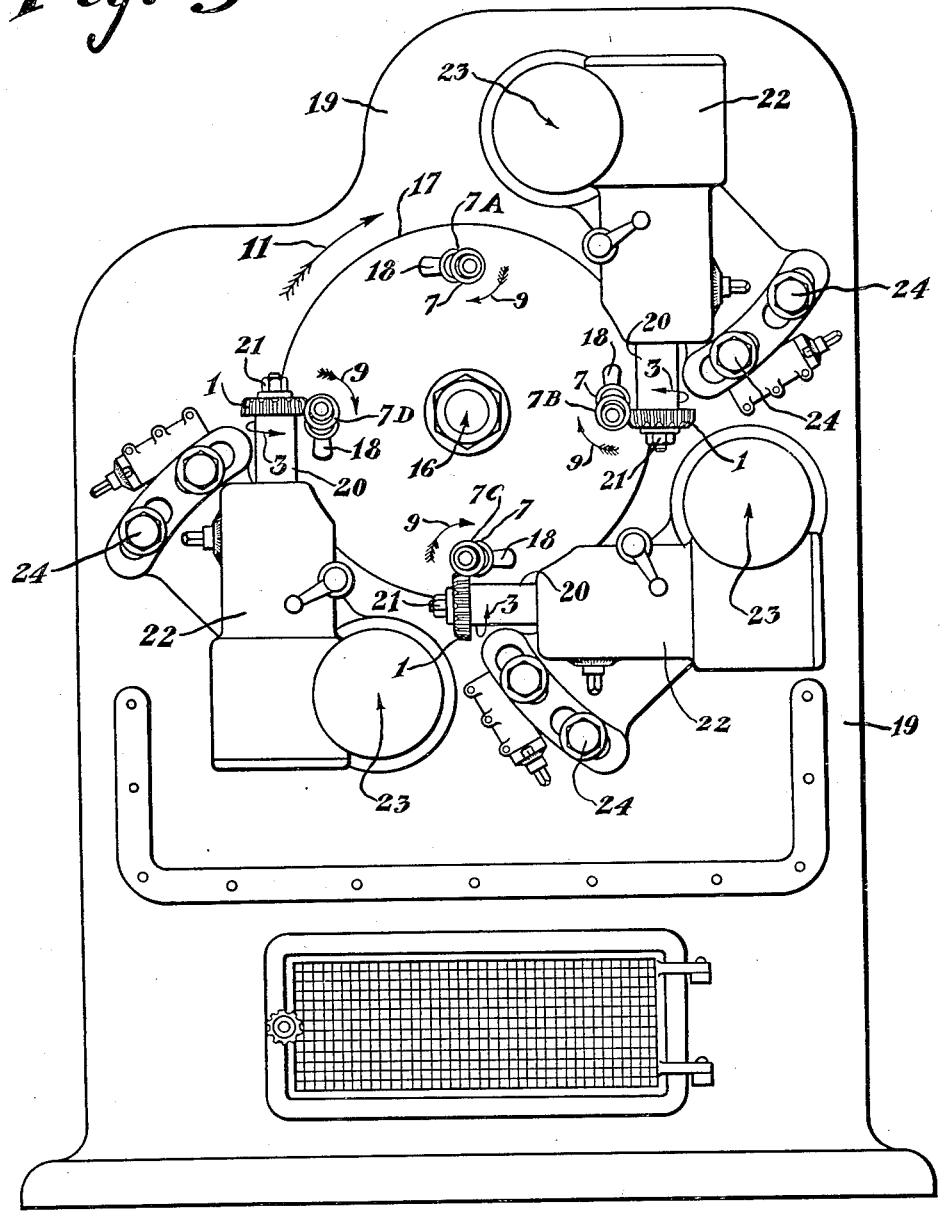

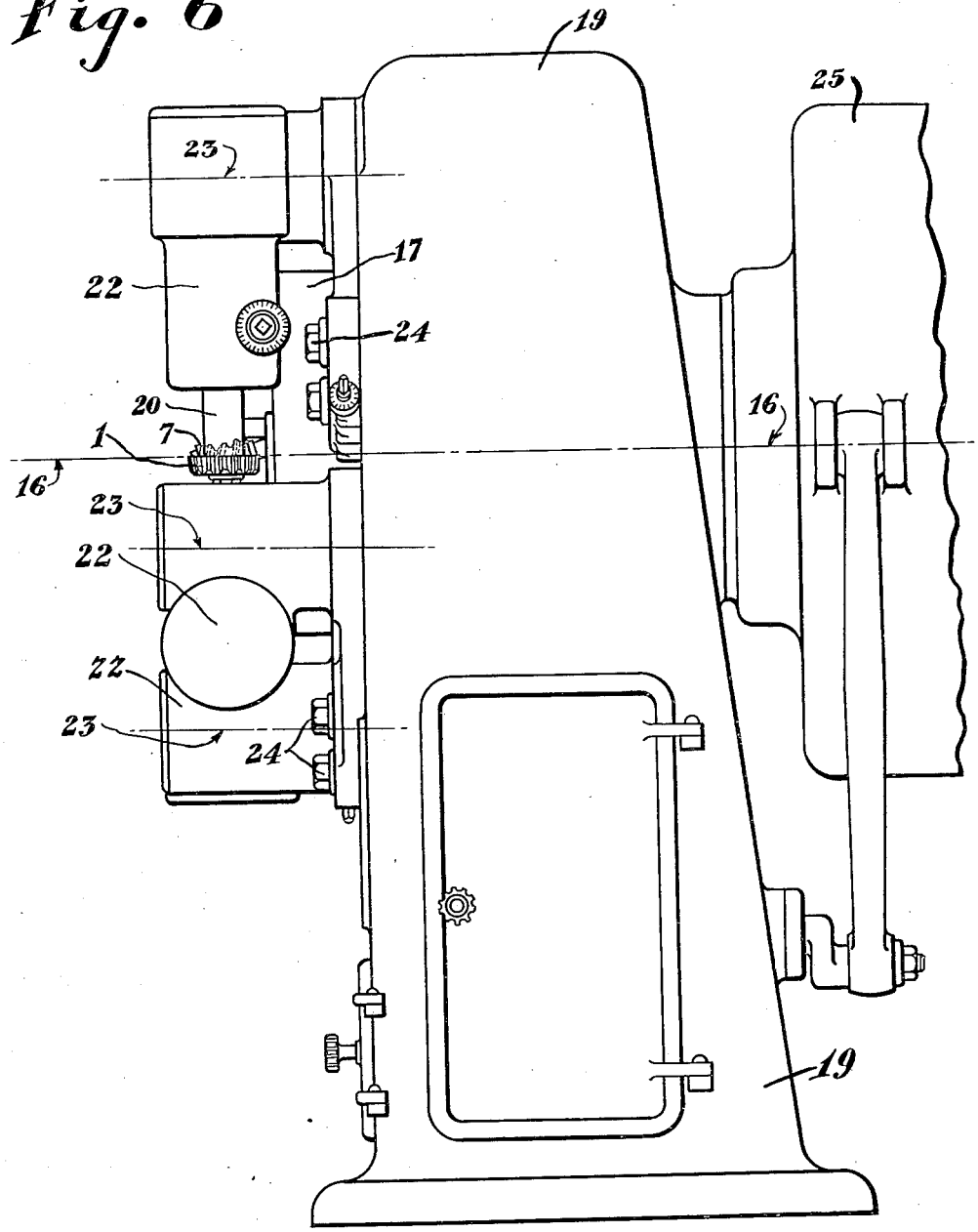

2,028,929

UNITED STATES PATENT OFFICE 2,028,929

METHOD OF AND APPARATUS FOR GENERATING HOLLOW FACED WORMS AND THE LIKE

Oliver G. Simmons, Lakewood, Ohio, assignor, by mesne assignments, to Dual L. Simmons Application July 31, 1931, Serial No. 554,286

25 Claims. (Cl. 90—4)

This invention relates to a method of and apparatus for generating hollow faced worms and the like. More particularly worms and the like of the hourglass type, which have one or more helical grooves gradually increasing in depth from the opposite ends of the worm to the center thereof, to conform substantially to the periphery of a gear of a predetermined size meshing with the worm and disposed with its axis at an angle to the axis of the worm. The present invention is an improvement of the method described in my Patent No. 1,426,680, dated August 22, 1922, entitled "The generation of convolute lines in hobbing cutters and the like."

The present invention has for its object to provide a method of cutting worms of the character described with a rotary intermeshing cutter, such as a gear shaped cutter, operating on a truly complete molding generating principal, as distinguished from my prior patent, whereby the worms may be rapidly and accurately cut.

A further object of the invention is to provide a method by which one or a plurality of rotating worms may be generated with one or a plurality of rotating straight tooth gear shaped cutters.

A further object of the invention is to provide a method by which a plurality of rotating worms may be successively operated upon and generated with a plurality of rotating straight teeth gear shaped cutters, the worm relatively passing across the plurality of cutters.

A further object of the invention is to provide a method by which worms and the like may be generated with straight teeth gear shaped cutters by relative movement of the work and cutters along a curved path simultaneously with rotary movement of the cutters and work.

A further object of the invention is to provide a method by which worms and the like may be generated with straight teeth gear shaped cutters by relative movement of the work and cutters along a planet path simultaneously with intermeshing rotary movement of the cutters and work.

A further object of the invention is to provide a method by which worms and the like may be generated with straight teeth gear shaped cutters rotating on an axis angularly disposed to the axis of the rotating worm and relatively moving the cutter and worm blank along a curved path.

A further object of the invention is to provide a method by which worms and the like may be generated with straight teeth gear shaped cutters by rotating the cutter on its axis disposed at an angle to the axis of a rotating worm, the axis of inclination being substantially equal to the angle of helix of the threads to be generated in the worm, and relatively moving the cutter and work into and out of cutting contact along a curvilinear path.

A further object of the invention is to provide a method by which worms and the like may be generated with straight teeth gear shaped cutters by rotating the cutter on its axis disposed at an angle to the axis of a rotating worm, the axis of inclination being substantially equal to the angle of helix of the threads to be generated in the worm, and relatively moving the cutter and work into and out of cutting contact along a curvilinear path, the axis of which is disposed at an angle to the axis of the work.

A further object of the invention is to provide a method by which worms and the like may be generated with straight teeth gear shaped cutters by rotating the cutter on its axis disposed at an angle to the axis of a rotating worm, the axis of inclination being substantially equal to the angle of helix of the threads to be generated in the worm, and relatively moving the cutter and work into and out of cutting contact along a curvilinear path, the axis of which is substantially normal to the axis of the cutter.

A further object of the invention is to provide a machine or apparatus for practicing this method, with means for supporting the spindles carrying the rotating plurality of cutters and means for supporting the spindles carrying the rotating plurality of worms or the like, and means for carrying the plurality of cutter spindle supports and the plurality of worm spindle supports.

A further object of the invention is to provide a support for a plurality of work spindles, comprising a unitary part in the form of a turret adjacent to the plurality of cutter spindle supports and adapted to be mounted in a frame support which also carries the plurality of supports carrying the plurality of cutter spindles.

A further object of the invention is to provide a method by which worms may be generated with a straight tooth gear shaped cutter, the axis of the cutter being disposed to the axis of the worm equal to substantially the angle of helix of the worm, rotating the worm and cutter in timed relation and relatively moving the cutter and worm in a planetary curved path in intermeshing cutting contact to generate conjugate threads or teeth, single or multiple, in the worm.

A further object of the invention is to provide a method of generating worms and the like which comprises rotating a gear shaped cutter in timed relation with a rotating worm blank, the axis of the work being disposed substantially to the angle of helix of the worm with respect to the planetary axis of rotation, and disposing the axis of the cutter substantially normal to the planet axis.

It is a further important object of this invention to provide a method by which a plurality of worms or the like may be operated upon simultaneously by a plurality of cutters, arranged to operate in sequence of steps upon a plurality of worms to simultaneously rough out, semi finish and finish with a rapid index between the successive steps and with a relative slow feed planet movement during the actual cutting operation, during which time the cutters are in cutting contact with the worms, and another step providing an unloading and loading station through which the finished work will pass slowly in its planetary feed movement and during this movement of passage, the finished worm may be removed from the spindle and a worm blank or other analogous articles of manufacture substituted.

It is a further important object of this invention to provide a method of generating worms and the like which comprises rotating a gear shaped cutter in timed relation with a rotating worm blank, the axis of the work and the axis of the cutter being relatively disposed angularly to the helix angle of the worm threads, relatively moving the work and cutter into intermeshing cutting contact in a curvilinear path, during which passage the teeth of the cutter will finish generate one side of the worm thread when entering the worm, and will generate the opposite side of the worm thread when leaving the worm.

Within the scope of the term "analogous articles of manufacture" it is understood that there is included such articles as have threads or teeth, single or multiple, capable of being generated on lines of convolution on a cylindrical or other surface of revolution.

The invention further consists in the means for accomplishing the foregoing objects and other objects of the invention which will later appear, not only in the particular form herein illustrated, but in all equivalent construction and arrangements.

With the above and other objects in view, the invention may be said to comprise the method and apparatus for practicing same, as illustrated in the accompanying drawings hereinafter described, and particularly set forth in the appended claims, together with such variation and modification thereof as will be apparent to one skilled in the art to which the invention appertains.

Reference should be had to the accompanying drawings, forming a part of this specification, in which:

Fig. 1 is a diagrammatic front view of the cutter and worm blank, illustrating the relative position of the cutter and blank before the cutting of the threads actually begins in the planetary movement of the blank across the face of the cutter.

Fig. 2 is similar to Fig. 1, except in this view the blank has passed across the face of the cutter.

Fig. 3 is the side elevation of Fig. 2, viewed from a position to the left of the observer.

Fig. 4 is a plan view of Fig. 2 showing the finished worm to the right side of the drawing, in full lines, and the worm blank to the left of the cutter, in dotted lines. The position of the blank in dotted lines with respect to the cutter is a corresponding plan view of Fig. 1.

Fig. 5 is a front elevation of the apparatus or machine for practicing the method of this invention.

Fig. 6 is a side view of the machine shown in Fig. 5 viewed from a position to the right of the observer.

In the accompanying drawings the straight tooth cutter is indicated by the numeral 1. It is adapted to be rotated on its axis 2—2, in the direction of the arrow indicated by the numeral 3.

Cutter 1 is provided with teeth, which teeth are of any desired shape or form. The cutter is further provided with a face cutting angle 5, which may be of any desired angle for efficient cutting action on the work. The cutter is further provided with the bore 6, which adapts it to be firmly secured to the cutter spindle of suitable apparatus or machine as will be hereinafter described.

The worm blank is indicated by the numeral 7, the form of worm blank shown being of the conventional hourglass or hollow faced type, the hollow face being indicated by the numeral 8. The axis of the worm blank is disposed at an angle to the plane of the sheet of drawing on which it is shown. This angle corresponds to the angle of helix of the work. The intermeshing spur rack to such a worm will be perpendicular to the sheet of drawing of Fig. 1 and the plane of the teeth of such rack will either coincide with the flat surface of the sheet of drawing or will be parallel to it. Hence, the teeth 4 of the cutter 1 are parallel to the rack teeth and the axis 2—2 of the cutter is normal to the longitudinal axis of the rack and will, therefore, either lie in the plane of the sheet of drawing or in a plane parallel to it.

The blank 7 is adapted to be rotated in the direction of the arrow 9 in timed relation with the rotation of the cutter 1.

If there are thirteen teeth in the cutter and a single thread is destined to be generated in the worm, the timed relation referred to will be in the order of thirteen to one, that is to say, the worm blank 7 will make thirteen revolutions while the cutter 1 makes one revolution.

The timed relation referred to is fixed so long as the worm 7 remains in a predetermined fixed angular position relative to the cutter as shown in the drawings. Contemplated by this invention to truly generate the threads or teeth in the blank 7, I prefer to move the blank 7 in a planetary path through and past the cutter 1, preferably along a curvilinear line 10, a planet path, in the direction of the arrow 11.

During the aforesaid movement and while the cutter 1 is rotating in the direction of the arrow 9, the blank 7 will have moved from the position shown in Fig. 1 to the position shown in Fig. 2, and during this movement the teeth 4 of the cutter 1 will truly generate their conjugate tooth in the form of a thread in the blank 7.

The threads indicated by the numeral 12 in the worm 7 is best shown in Fig. 3.

During the movement of the blank from the position shown in Fig. 1 to that shown in Fig. 2, along the curvilinear path 10, in the direction of the arrow 11, the blank 7 and the cutter 1 will rotate in timed relation in accordance with the ratio between the worm and the gear shaped cutter, as previously described and the teeth of the cutter will truly completely generate their conjugate thread in the worm, one side of which thread in the worm will be truly completely generated as the worm moves across the cutting face of the cutter. The generating cutting action on this side of the worm thread will be concluded as the cutter passes the midway or central portion of the worm, whereupon the opposite side of the thread will begin to be truly completely generated and the cutting generating action will be complete when the worm passes out of cutting contact.

From the foregoing it will be understood that the teeth of the cutter in a roughed out blank begin to cut at the outermost portion of the tooth in the work on one side of the thread as the work approaches cutting contact with the cutting edges of the cutter in its movement past the cutter. The tangential point of cutting contact between the side of the thread of the work and the conjugate side of the tooth of the cutter moves from the outermost portion on one side of the thread and gradually moves down toward the root portion of the thread. The cutting action then reverses from that side of the thread of the worm to the other side of the adjacent tooth and begins at the root portion of the tooth and gradually moves outwardly of the worm toward the outermost portion of the worm thread, finally reaching it as the worm in its planet movement leaves intermeshing contact with the cutter.

The planet path of movement of the work 7 past the cutter 1 will truly generate conjugate thread in the work and the rack conjugate to the cutter will also be conjugate to the teeth of the work and will properly mesh therewith throughout the entire length of the rack tooth. Contact, however, with respect to articles of manufacture of the family having helicoidal involute surfaces such as helical gears and the steering gear worm herein specifically referred to, will begin at the top at one end and at the outer edge of the tooth on one side thereof and will move across the face of the tooth along a diagonal line to the bottom thereof, and will continue along this diagonal line to the adjacent side of the next tooth and from the bottom to the top of the tooth at the opposite end thereof. Unless the generating cutting action is completed as described, a small amount of metal will be left at the tops of the teeth at opposite sides which will cause interference, and in the case of a steering gear worm an objectionable binding will take place between the worm and the worm wheel because of the improper mesh of the worm and its mating wheel.

It is highly desirable in the case of a steering gear worm for automobiles, that there be no play between the steering gear worm and the worm wheel sector when the car is traveling along a straight line. As the driver rotates the steering wheel to make a turn, it is preferable that this movement of rotating the steering gear worm, be accomplished with the greatest ease on the part of the driver. Manifestly, the movement must be smooth and uninterrupted, and by interruption I mean a restrained movement occasioned by interference between the teeth of the worm and its mating wheel which would cause the driver to exert greater pressure as he rotated the steering gear wheel. To obtain this smooth uninterrupted action, as referred to, I preferably move the work 7 past the cutter 1 in a curvilinear path 10 because by such movement along the planet path 10, a slightly greater amount of material is removed by the cutter at the outermost portions of the teeth of the worm than would be removed if the work 7 moved along a straight line instead of the curvilinear line 10. The removal of this additional amount of metal from the outermost portion of the teeth 12 of the worm 7 provides easier and smoother approach between the intermeshing teeth of the worm on the steering post and its mating wheel sector.

The speed of rotation of the worm 7 will be such as to provide a good cutting speed, such that the cutting edges 13 of the teeth 4 of the cutter 1 will truly cut the metal with a shearing cut, to generate the thread in the worm 7 economically and in a minimum of time, as for example, when the cutter is made of high speed steel a cutting speed may be used of about 80 to 100 feet per minute, depending upon the nature of the material in the worm. Similarly, if the cutting edges 13 of the cutter are tipped with a cutting alloy of tungsten carbide or tantalum carbide, a cutting speed of about 150 feet per minute may be used, depending again upon the nature of material in the worm 7.

Cutter 1 tipped as described with tungsten carbide or other carbide alloys, forms the subject matter of my companion application, Serial No. 392,150, filed September 12, 1929, for Gear shaper cutter and method of making same.

Fig. 4, as previously stated, illustrates the top plan view of Fig. 2, with the worm 7 of Fig. 1 shown in dotted lines in the relative position it would occupy with respect to Fig. 1 before the worm blank 7 begins to contact with the teeth 4 of the cutter 1, and as previously described, the worm axis is disposed at an angle to its planetary curvilinear path of travel 11. Fig. 4 illustrates this path of travel as a straight line, indicated by the arrow 11A, parallel to the straight line 14 which will lie in a surface of revolution. The numeral 15 indicates the angle of helix of the worm which, as previously stated, is disposed at this angle with respect to the surface of revolution as indicated in Fig. 4 by the line 14.

The axis of the curvilinear planet movement of the worm 7 is indicated at 16 in Figs. 5 and 6. The axis 16 is the axis of rotation of the turret 17, in which turret is mounted a plurality of work spindles 18 which are carried by turret support 17 and are adapted to have detachably secured thereto a plurality of worm blanks 7. The axis of the work spindle 18 is angularly mounted in the planetary turret 17 at an angle to the axis 16 of rotation of the turret 17 equal to the angle of helix 15 of the worm 7. The turret 7 is journaled in the frame support 19 and is carried thereby.

The cutter 1 is fixedly secured to the spindle 20 by means of conventional nut 21, having threaded engagement with the spindle.

The cutter spindle 20 is carried by the cutter support housing 22, which is pivoted at 23 adapting the housing to be circularly moved about its pivotal axis 23 to position the teeth 4 of the cutter 1 to the proper depth in the work 7, and to be secured in the adjusted position by means of the bolts 24 which clamp the cutter spindle carrying support 22 to the frame support 19.

Any suitable means may be provided for rotating the cutter spindle 20 and the cutter 1 fixed thereto, in the direction of the arrow 3, in timed relation with the worm 7 carried by the planet turret 17. It being understood, as previously described, that the worm 7 is rotating in the direction of the arrow 9, and having in addition, a slow planet movement while the worm 7 is in cutting contact with the cutter 1 and moving in the planet path indicated by the arrow 11.

After the work has passed across the cutter and has reached substantially the position shown in Fig. 2, the planetary turret 17 is indexed to move the work turret 17 quickly to bring the work to substantially the position indicated by Fig. 1, at which point the indexing ceases and the work again begins to move slowly in its planet path across the cutting edges of the cutter, the cycle to be repeated when the work has again reached substantially the position shown in Fig. 2.

It is contemplated by the method and machine of the present invention that the production of worms of the character referred to, more specifically in one respect hourglass steering gear worms for automobiles, shall be continuous and shall also make possible a maximum output of accurately generated worms in the shortest possible time. The machine will occupy the minimum of floor space and will make the work necessary to be performed by the operator as simple as possible with the least expenditure of energy.

To attain these ends it is necessary, as determined experimentally, to provide an unloading and loading station and in addition, to make the work on the cutter as easy as possible so as to give it a long cutting life, that there be provided in the present instance three cutting stations. The three cutting stations, plus the unloading and loading station, indicates in this example that four stations are desirable and accordingly are provided as illustrated in Fig. 5.

The three cutting stations provided from the practice referred to are divided into: First, roughing out of the work with a roughing cutter having a large angle of rake 5. This roughing cutter will be provided, in addition to the great rake, with shallow end teeth, preferably shorter than the depth of the thread in the work.

The second station will be provided with a semifinishing cutter having teeth with a cutting face of slightly smaller rake and with teeth slightly wider and deeper than that provided for the roughing cutter.

The third station is provided with a finishing cutter with teeth to the desired finished size, which will finish generate the threads in the worm to the desired conjugate shape and dimensions.

Accordingly, there are four work spindles provided, carried by the turret 17, and three cutter spindles with their respective cutters, carried by their respective supports.

The various stations referred to are indicated in Fig. 5 as follows:

7A indicates the unloading and loading position of the worm in its planet movement. When the worm is in this unloading and loading position the spindle 18 is restrained from rotation in the direction of the arrow 9. The turret 17, however, is feeding slowly in the direction of the arrow 11 since, as previously described, its rotational movement is continuous although made up of a slow feed movement and a rapid index movement. The operator, therefore, has ample time to unload and load the spindle with a new blank. He simply removes the finished steering gear worm and substitutes another blank.

The first roughing position of the worm is indicated by the reference character 7B. The semifinished position of the worm is indicated by the reference character 7C. The finishing position of the worm is indicated by the reference character 7D.

The rapid indexing of the work after the respective blanks have passed across the respective cutters, which is also in the direction of the arrow 11 as previously described, may be accomplished by any suitable means, preferably by an index head 25 which may be carried by the frame support 19.

The actual details of the mechanism for indexing, as well as the means for rotating the turret slowly in the direction of the arrow 11 between indexes of the planetary turret, together with means for rotating the various cutters in timed relation with the work and means of adjusting same axially of the cutter and about the pivot 23, together with other details and component parts of the machine may take any desired and well known form as pointed out above.

Having thus described my invention, I claim:

1. The herein described method of generating worms and the like, which consists in so positioning a gear shaped cutter with respect to a worm blank that the teeth of the cutter in proximity to the blank, extend in the direction of the worm thread to be generated, and relatively feeding the blank in a planet path across the face thereof in the direction of the worm thread while continuously rotating the blank and cutter at relative speeds corresponding to the tooth ratio between the cutter and the worm to be generated.

2. The herein described method of generating worms and the like which consists in positioning a straight tooth gear shaped cutter in proximity to a worm blank with the front face of the cutter offset laterally with respect to the common normal to the axis of the cutter and worm, and with the plane of said front face normal to the thread helix measured in a plane perpendicular to said face, and relatively feeding the blank in a planet path across the face of the cutter in the direction of the axis of the cutter while continuously rotating the blank and cutter at relative speeds corresponding to the tooth ratio between the cutter and the worm to be generated.

3. The herein described method of generating worms and the like which consists in positioning a straight tooth gear shaped cutter in proximity to a worm blank with the front face of the cutter offset laterally with respect to the common normal to the axis of the cutter and worm, and with the plane of said front face normal to the thread helix measured in a plane perpendicular to said face, continuously rotating the blank and cutter at relative speeds corresponding to the tooth ratio between the cutter and worm to be generated, relatively feeding the rotating blank into and out of cutting contact with the rotating cutter in a planet path in a direction parallel to a surface of revolution, the axis of which is common to that of the planet movement of feed.

4. The herein described method of generating worms and the like which consists in positioning a gear shaped cutter in proximity to a worm blank, with its axis at an angle to the axis of the blank and with its front face offset laterally with respect to the common normal to the axis of the cutter and blank, rotating the blank and cutter at relative speeds corresponding to the tooth ratio between the cutter and worm to be generated and relatively feeding the rotating cutter and rotating worm blank in a curvilinear direction into and out of generating cutting contact.

5. The herein described method of generating worms and the like with a cutter having a circumferential row of cutting teeth shaped to correspond to the teeth of a gear and having cutting edges, each of which lies substantially in a conical surface of revolution of the cutter, which consists in relatively positioning the cutter and blank so that the axis of one extends across the axis of the other at an angle such that the teeth of the cutter in proximity to the blank are disposed substantially parallel to a thread of the worm to be generated, relatively feeding the cutter and blank in a curved path tangentially across the blank in the direction of the worm threads while rotating the cutter and blank at relative speeds corresponding to the tooth ratio between the cutter and worm being generated.

6. The herein described method of generating worms and the like with a cutter having a circumferential row of cutting teeth shaped to correspond to the teeth of a gear and having cutting edges, each of which lies substantially in a conical surface of revolution of the cutter, which consists in relatively positioning the cutter and blank with the axis of one extending across the axis of the other at an angle such that the teeth of the cutter in proximity to the blank are disposed substantially parallel to a thread of the worm to be generated, rotating the cutter and blank at relative speeds corresponding to the tooth ratio between the cutter and the worm being generated, and relatively feeding the cutter and blank in a tangential curvilinear path into and out of generating cutting contact, to fully finish generate one side of the thread in the blank and to fully finish generate the opposite side while the cutter and blank are leaving each other.

7. The herein described method of generating worms and the like which consists in positioning a straight tooth gear shaped cutter with its axis extending across the axis of a worm blank at an angle substantially corresponding to the helix angle of a thread of the worm to be generated, and with the common normal to the axes of the cutter and blank substantially midway between the ends of the blank, and relatively feeding the cutter and blank in the direction of the cutter axis into and out of generating cutting contact in a planetary tangential path relatively across the face of the blank to finish generate cut threads in the blank while rotating the cutter and blank at relative speeds corresponding to the tooth ratio between the cutter and worm wheel to be generated.

8. The herein described method of generating worms and the like which consists in positioning a straight tooth gear shaped cutter with its axis extending across the axis of a worm blank at an angle substantially corresponding to the helix angle of the thread of the worm to be generated and with the common normal to the axes of the cutter and blank substantially midway between the ends of the blank, rotating the cutter and blank at a fixed speed ratio corresponding to the tooth ratio between the cutter and worm to be generated, relatively feeding the cutter and blank in the direction of said common normal in a curvilinear path to finish generate one side of the thread of the worm and continuing this movement in a planetary path to finish generate the opposite side of the thread of the worm.

9. The herein described method of generating worms and the like adapted to mesh with a given helical gear by means of a straight tooth gear shaped cutter, which is conjugate to the rack of said helical gear and which has a greater number of teeth than the helical gear, which consists in so positioning the cutter that its axis crosses the axis of the blank at an angle corresponding to the helix angle of the thread of the worm to be generated and relatively feeding the cutter and blank together in the direction of the cutter axis in a tangential curvilinear path across the blank while rotating the cutter and blank at relative speeds corresponding to the tooth ratio between the cutter and worm to be generated.

10. The herein described method of generating worms and the like, which consists in so positioning a plurality of gear shaped cutters with respect to a plurality of worm blanks that the teeth of the cutters in proximity to the blanks extend in the direction of the threads in the plurality of worms to be generated, and relatively feeding the plurality of blanks in a planet path to successively move each of the blanks across the face of each of the cutters in the direction of the thread in the plurality of worms while continuously rotating the blanks and cutters at relative speeds corresponding to the tooth ratio between the cutter and the worm to be generated.

11. The herein described method of generating worms and the like which consists in rotating a gear shaped cutter in timed relation with a rotating worm blank corresponding to the tooth ratio between the cutter and worm to be generated, the blank so positioned that the teeth of the cutter in proximity to the blank extend in the direction of the worm thread to be generated, and relatively moving the work and cutter into intermeshing cutting contact in a curvilinear path to generate one side of the thread and continuing this movement in the same direction to generate the other side of the thread.

12. In a machine for generating worms and the like, a frame, a turret adapted to have continuous rotation and to receive and support a work spindle and having its support journaled in said frame, a spindle adapted to receive a cutter and mounted in a cutter spindle support, said cutter spindle support being fixed to said frame, and means for continuously rotating said turret and for rotating the work spindle and cutter spindle in timed relation such that the blank and cutter carried thereby when in operative engagement will rotate at a speed corresponding to the relative speed of rotation of the intermeshing cutter and finished worm.

13. In a machine for generating worms or the like, a frame, a rotatable turret having its support carried by the frame, a rotatable work spindle angularly mounted in the turret at an angle to the plane of revolution of the turret equal to the helix angle of the worm to be generated, a rotatable cutter spindle carried by said frame, means for rotating said spindles in time relation, and means for continuously rotating said turret during the operation of the machine.

14. In a machine for generating worms or the like, a frame, a rotatable turret having its support carried by the frame, a plurality of rotatable work spindles mounted in the turret at an angle to the plane of revolution of the turret equal to the helix angle of the worm to be generated, a rotatable cutter spindle carried by said frame, means for rotating said spindles in timed relation, and means for continuously rotating said turret during the operation of the machine.

15. In a machine for generating worms and the like, a frame, a rotatable turret having its support carried by the frame, a rotatable work spindle mounted in the turret at an angle to the plane of revolution thereof equal to the helix angle of the worm to be generated, a rotatable cutter spindle carried by said frame and having its axis parallel to the plane of revolution of the turret, means for rotating said spindles in timed relation, and means for continuously rotating said turret during the operation of the machine.

16. In a machine for generating worms and the like, a frame, a rotatable turret having its support carried by the frame, a plurality of rotatable work spindles mounted in the turret at an angle to the plane of revolution thereof equal to the helix angle of the worms to be generated, a plurality of rotatable cutter spindles carried by said frame and having their axes parallel to the plane of revolution of the turret, means for rotating said spindles in timed relation, and means for continuously rotating said turret during the operation of the machine.

17. In a machine for generating worms and the like, a frame, a turret adapted to have continuous rotation and to receive and support a plurality of work spindles and having its support journaled in said frame, a plurality of spindles adapted to receive cutters and mounted in cutter spindle supports, said cutter spindle supports being fixed to said frame, and means for continuously rotating said turret and for rotating the work spindles and the cutter spindles in timed relation such that the blanks and the cutters carried thereby when in operative engagement will rotate at a speed corresponding to the relative speed of rotation of the intermeshing cutters and the finished worms.

18. The herein described method of simultaneously generating a plurality of worms or the like which consists in continuously and simultaneously moving the worm blanks in a curvilinear path and in the direction of the worm threads to be generated successively into and out of cutting engagement with each of a plurality of gear shaped cutters so positioned that the teeth of the cutters in proximity to the blanks extend in the direction of the worm threads, and continuously rotating the blanks and cutters during the curvilinear movement of the blanks at relative speeds of rotation corresponding to the tooth ratio between the cutters and the worms to be generated.

19. The herein described method of simultaneously generating a plurality of worms or the like which consists in simultaneously and continuously relatively moving in a curvilinear path and in the direction of the worm threads to be generated and successively into and out of cutting engagement with each other a plurality of worm blanks and a plurality of gear shaped cutters, the latter being so positioned that the teeth of the cutters in proximity to the blanks extend in the direction of the worm threads, and continuously rotating the blanks and cutters during the relative curvilinear movement thereof at relative speeds of rotation corresponding to the tooth ratio between the cutters and the worms to be generated.

20. The herein described method of simultaneously generating a plurality of worms or the like adapted to mesh with a given helical gear which consists in continuously and simultaneously moving the worm blanks in a curvilinear path successively into and out of cutting engagement with each of a plurality of straight tooth gear shaped cutters conjugate to the rack of said helical gear and having a greater number of teeth than the helical gear, the cutters being so positioned that their axes cross the axes of the blanks at angles corresponding to the helix angle of the threads of the worms to be generated, and simultaneously rotating the cutters and blank at relative speeds corresponding to the tooth ratio between the cutters and the worms to be generated.

21. The method of generating worms and the like which consists in positioning a gear shaped cutter in proximity to a worm blank with the front face of the cutter offset laterally with respect to the common normal to the axis of the cutter and worm and with the plane of said front face normal to the thread helix measured in a plane perpendicular to said face, and relatively feeding the blank in a planet path across the face of the cutter in the direction of the axis of the cutter while continuously rotating the blank and cutter at relative speeds corresponding to the tooth ratio between the cutter and the worm to be generated.

22. The method of generating worms and the like which consists in relatively moving a gear shaped cutter and worm blank in a curvilinear path into and out of cutting engagement with each other with the axis of the worm blank disposed substantially at the angle of helix with respect to the axis of said curvilinear movement, and rotating the cutter and worm blank at relative speeds corresponding to the tooth ratio between the cutter and the worm to be generated.

23. The method of generating worms and the like which consists in relatively moving a gear shaped cutter and worm blank in a curvilinear path into and out of cutting engagement with each other with the axis of the worm blank disposed substantially at the angle of helix with respect to the axis of said curvilinear movement and with the axis of the cutter disposed substantially normal to the axis of said curvilinear movement, and rotating the blank and cutter at relative speeds corresponding to the tooth ratio between the cutter and the worm to be generated.

24. The method of generating worms and the like which consists in relatively moving a plurality of gear shaped cutters and a plurality of worm blanks in a curvilinear path successively into and out of cutting engagement with each other with the axes of the worm blanks disposed substantially at the angle of helix with respect to the axis of said curvilinear movement, and continuously rotating the blanks and cutters at relative speeds corresponding to the tooth ratio between the cutter and the worm to be generated.

25. The method of generating worms and the like which consists in relatively moving a plurality of gear shaped cutters and a plurality of worm blanks in curvilinear path successively into and out of cutting engagement with each other with the axes of the worms disposed substantially at the angle of helix with respect to the axis of said curvilinear movement and with the axes of the cutters disposed substantially normal to the axis of said movement and continuously rotating the blanks and cutters at relative speeds corresponding to the tooth ratio between the cutter and the worm to be generated.

OLIVER G. SIMMONS.